(12) United States Patent
LoSasso

(10) Patent No.: US 8,961,186 B2
(45) Date of Patent: Feb. 24, 2015

(54) ACCESSORY FOR A WALKER TO IMPROVE GAIT PERFORMANCE

(71) Applicant: Patrick LoSasso, Los Angeles, CA (US)

(72) Inventor: Patrick LoSasso, Los Angeles, CA (US)

(*) Notice: Subject to any disclaimer, the term of this patent is extended or adjusted under 35 U.S.C. 154(b) by 113 days.

(21) Appl. No.: 13/660,325

(22) Filed: Oct. 25, 2012

(65) Prior Publication Data

US 2013/0167888 A1 Jul. 4, 2013

Related U.S. Application Data

(63) Continuation-in-part of application No. 13/341,622, filed on Dec. 30, 2011, now abandoned.

(51) Int. Cl.

| | | |
|---|---|---|
| G09B 19/00 | (2006.01) |
| A61H 3/06 | (2006.01) |
| A63B 71/06 | (2006.01) |
| A61H 3/04 | (2006.01) |
| A63B 22/00 | (2006.01) |
| A63B 22/20 | (2006.01) |
| A63B 24/00 | (2006.01) |

(52) U.S. Cl.
CPC ............ *A61H 3/061* (2013.01); *A63B 71/0622* (2013.01); *A61H 3/04* (2013.01); *A63B 22/001* (2013.01); *A63B 22/20* (2013.01); *G09B 19/003* (2013.01); *A61H 2201/1261* (2013.01); *A61H 2201/5023* (2013.01); *A63B 2022/0092* (2013.01); *A63B 2024/0068* (2013.01); *A63B 2071/0625* (2013.01); *A63B 2071/063* (2013.01); *A63B 2208/0204* (2013.01); *A63B 2209/10* (2013.01); *A63B 2220/801* (2013.01); *A63B 2220/836* (2013.01); *A63B 2225/50* (2013.01)
USPC .......................................................... 434/255

(58) Field of Classification Search
USPC ........................................................ 434/247
See application file for complete search history.

(56) References Cited

U.S. PATENT DOCUMENTS

2006/0292533 A1* 12/2006 Selod ............................ 434/247
2010/0100013 A1 4/2010 Hu

* cited by examiner

*Primary Examiner* — Kesha Frisby
(74) *Attorney, Agent, or Firm* — Knobbe, Martens, Olson & Bear, LLP

(57) ABSTRACT

Systems and methods are provided for a rehabilitative and ambulation accessory for a walker. The system provides visual and auditory cues to improve the movement pattern or walking ability of an individual with gait problems caused by physiological or neurological issues, injury, or surgical wounds. The invention may also be used as an exercise training device. The invention includes two balls which illuminate in an alternating fashion to provide a visual target for each leg. The user then reaches for the illuminated ball with his foot. When sensors inside the balls are triggered, the system returns visual and auditory feedback, such as a bright light and a pleasing tone indicating a successful step.

20 Claims, 15 Drawing Sheets

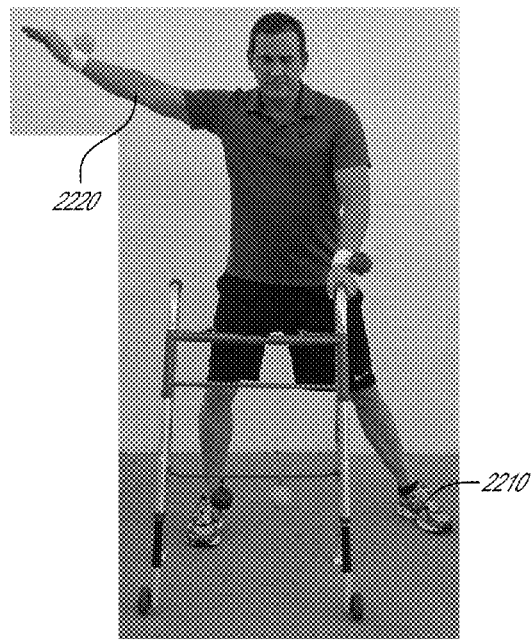
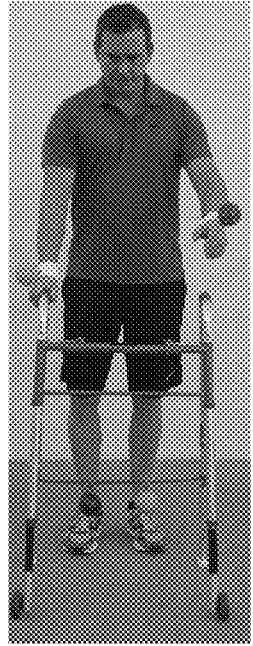
FIG. 22  FIG. 23
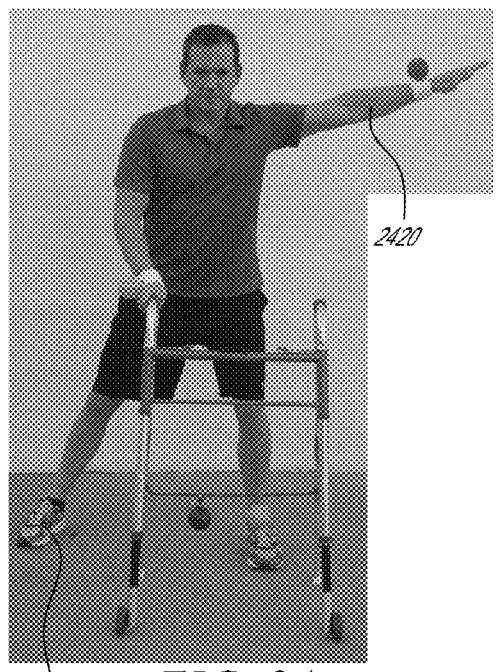
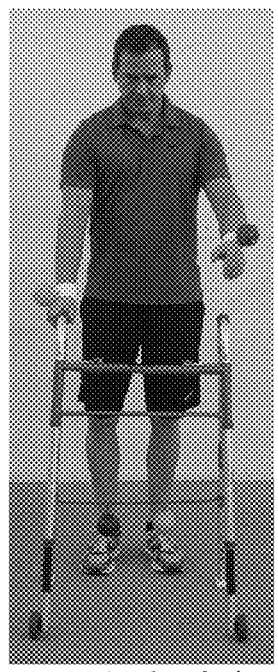
FIG. 24  FIG. 25

ACCESSORY FOR A WALKER TO IMPROVE GAIT PERFORMANCE

CROSS-REFERENCE TO RELATED APPLICATIONS

The present application is a continuation-in-part of co-pending U.S. patent application Ser. No. 13/341,622, filed Dec. 30, 2011, which is incorporated herein by reference and should be considered a part of this specification.

BACKGROUND

1. Field

The invention relates to improving the movement pattern or walking ability of an individual with gait problems caused by physiological or neurological issues, injury, or surgical wounds. The invention may be used for rehabilitative, training, and/or exercise purposes.

2. Background

Individuals with neurological conditions such as Parkinson's Disease, Huntington's Chorea, Multiple Sclerosis, traumatic brain injuries (TBI), stroke, etc., often present problems with gait or walking. Studies have shown that visual cues can help improve the individual's gait and initiate movement. (Movement Disorders: Volume 17, Issue 6, pages 1148-1160, November/December 2002. The power of cueing to circumvent dopamine deficits: A review of physical therapy treatment of gait disturbances in Parkinson's disease. Tamar C. Rubinstein MSc, Nir Giladi MD, Jeffrey M. Hausdorff PhD). There are commercially available products such as the STEPOVER WAND® which is a device commonly used for individuals with gait related issues, but nothing is available as a walker accessory which provides visual cues and visual/auditory feedback. Often individuals with the above neurological conditions have one side of their body which is more compromised than the other. Thus, the ability to provide stimuli or cues to a specific leg is valuable.

SUMMARY

In certain embodiments, a system for improving movement in a user comprises a flexible front cross bar configured for removable attachment to a walker, a first ball configured to attach to the front cross bar, and a second ball configured to attach to the front cross bar. The first ball includes electronic circuitry, a first light, and a first sensor, and the first ball is configured to provide a first visual cue. The second ball includes electronic circuitry, a second light, and a second sensor, and the second ball is configured to provide a second visual cue. The first visual cue and the second visual cue instruct the user to move legs in a particular order so as to improve walking gait of the user. In one embodiment, the first visual cue comprises the first light turning on, and the second visual cue comprises the second light turning on.

In some embodiments, the first sensor associated with the first ball is a magnetic sensor and the second sensor associated with the second ball is a magnetic sensor. In some embodiments, a system for improving movement in a user further comprises one or more magnets configured to removably attach to the user's ankle.

In certain embodiments, the first ball is configured to provide a first visual feedback when the first sensor is triggered, and the second ball is configured to provide a second visual feedback when the second sensor is triggered. In some embodiments, the first visual feedback comprises the first light glowing brighter, followed by the first light turning off, and the second visual feedback comprises the second light glowing brighter, followed by the second light turning off. In some embodiments, the system further comprises a speaker electronically coupled to the first and second balls. The speaker is configured to provide auditory feedback when the first or second sensor is triggered.

In some embodiments, a system for improving movement in a user further comprises a controller in electronic communication with the first ball and the second ball. The controller is configured to control operation of the first visual cue and the second visual cue. In some embodiments, the system further comprises a speaker in electronic communication with the controller. The speaker is configured to provide auditory feedback when the first or second sensor is triggered. The controller is configured to control operation of the auditory feedback. In some embodiments, the first ball is configured to provide a first visual feedback when the first sensor is triggered, and the second ball is configured to provide a second visual feedback when the second sensor is triggered. The controller is configured to control operation of the first visual feedback and the second visual feedback.

In one embodiment, the controller includes one or more independent triggers. In one embodiment, the controller is configured to track times at which the first sensor is triggered and times at which the second sensor is triggered. In one embodiment, the controller is configured to control the frequency of the first visual cue and the frequency of the second visual cue.

In certain embodiments, the vertical position of the front cross bar is adjustable. In some embodiments, the anterior-posterior position of the front cross bar is adjustable. In some embodiments, the first and second balls are configured to move along the front cross bar.

In certain embodiments, a system for improving movement in a user comprises a flexible front cross bar configured for removable attachment to a walker, a first ball configured to attach to the front cross bar, and a second ball configured to attach to the front cross bar. The first ball is configured to provide a first visual cue and the second ball is configured to provide a second visual cue. The first visual cue and the second visual cue instruct the user to move legs in a particular order so as to improve walking gait of the user.

In some embodiments, the first visual cue comprises a first predetermined color and the second visual cue comprises a second predetermined color. In some embodiments, the first visual cue is provided by a first light associated with the first ball, and the second visual cue is provided by a second light associated with the second ball. In certain embodiments, the system further comprises a controller in electronic communication with the first ball and the second ball. The controller is configured to control operation of the first visual cue and the second visual cue.

In some embodiments, the system further comprises a first wrist ball configured to removably attach to the user's first wrist, and a second wrist ball configured to removably attach to the user's second wrist. In some embodiments, the first wrist ball is configured to provide a visual cue, and the second wrist ball is configured to provide a visual cue. The visual cues instruct the user to move arms in a particular order so as to improve reciprocal movement of the user.

BRIEF DESCRIPTION OF THE DRAWINGS

FIG. 22 is a schematic front view of an embodiment of the invention with a user practicing a reciprocal movement exercise with lateral steps.

FIG. 23 is a schematic front view of an embodiment of the invention with a user practicing a reciprocal movement exercise with lateral steps.

FIG. 24 is a schematic front view of an embodiment of the invention with a user practicing a reciprocal movement exercise with lateral steps.

FIG. 25 is a schematic front view of an embodiment of the invention with a user practicing a reciprocal movement exercise with lateral steps.

DETAILED DESCRIPTION

Figure 1:
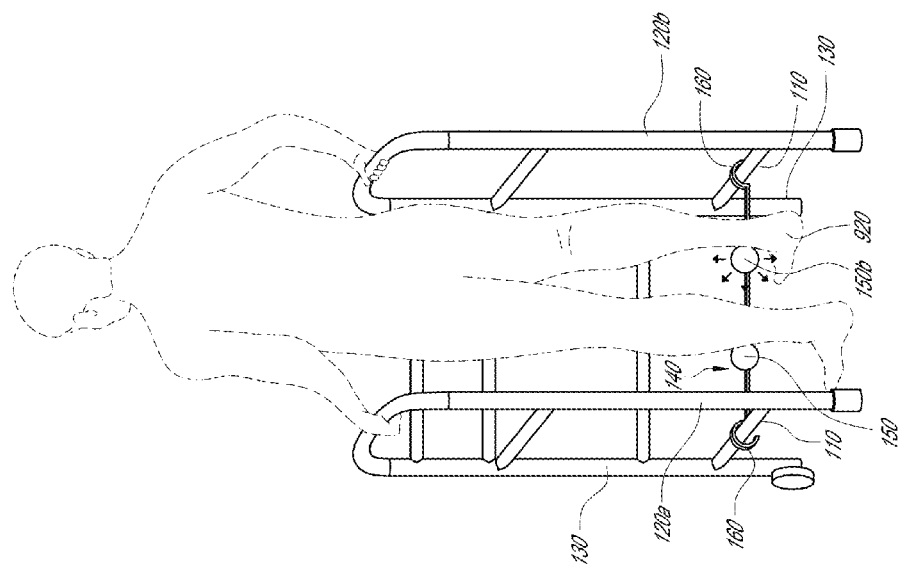
FIG. 1 is a schematic back perspective view of a user utilizing the invention and moving his left foot.
Figure 2:
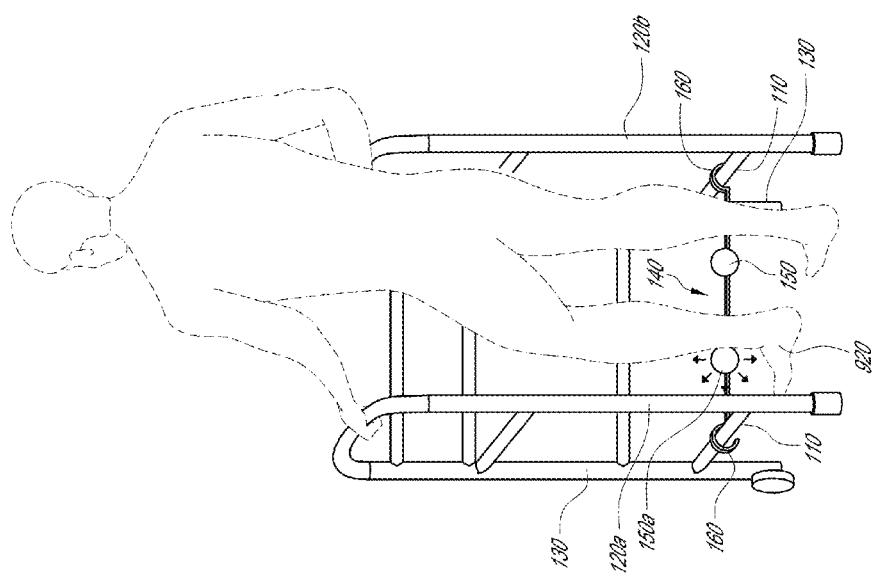
FIG. 2 is a schematic back perspective view of a user utilizing the invention and moving his right foot.

The present invention is directed to a system for improving movement in a user. The movement includes the user moving his foot to improve gait performance, such as minimum stride length, cadence, gait symmetry, and stepping speed. Referring to FIGS. 1-2, an exemplary embodiment of a system includes a walker, roller, or any similar assistive walking device with a frame extending upward from the walking surface to support a user while on foot, e.g., while walking, running, or standing. As used herein, "walker" shall refer to any or all of the above. In one embodiment, the system includes side cross bars 110 attached to the front legs 120a,b and back legs 130 of a walker, a front cross bar 140 attached to the side cross bars 110, and a pair of balls 150 attached to the front cross bar 140. In another embodiment, shown in FIG. 3, the front cross bar 140 attaches to the left 120a and right legs 120b of a walker 100. In one embodiment, the balls 150 are spherical in shape. The balls may also be shaped ellipsoid, cylindrical, or any other suitable shape. As used herein, "ball" or "balls" shall include any or all of these shapes. Returning to FIGS. 1-2, a visual cue from a ball prompts the user to move his foot toward the ball. In one embodiment, the visual cues comprise different colored balls. In this embodiment, the color of the left ball 150a prompts the user to move his left foot toward that ball 150a, and the color of the right ball 150b prompts the user to move his right foot toward that ball 150b.

The front cross bar 140 is flexible so as not to injure or cause discomfort to the user when the user nears or hits a ball 150. For example, in one embodiment, the front cross bar 140 is made of elastic medical grade tubing. In an exemplary embodiment, the front cross bars 140 attach to the side cross bars 110 using hooks 160. The front cross bar 140 may also attach to the side cross bars 110 using straps, clamps, clips, rings, clasps, fasteners, or any other suitable attachment mechanism. In one embodiment, the front cross bar 140 is movable along the side cross bars 110. Thus, the anterior-posterior position of the front cross bar 140 is adjustable so that the front cross bar 140 and balls 150 can be positioned closer to or farther away from the user. In this manner, the system accommodates for different stride lengths. The system can also be used to train a user to take longer strides as part of a gait rehabilitation program.

Figure 3:
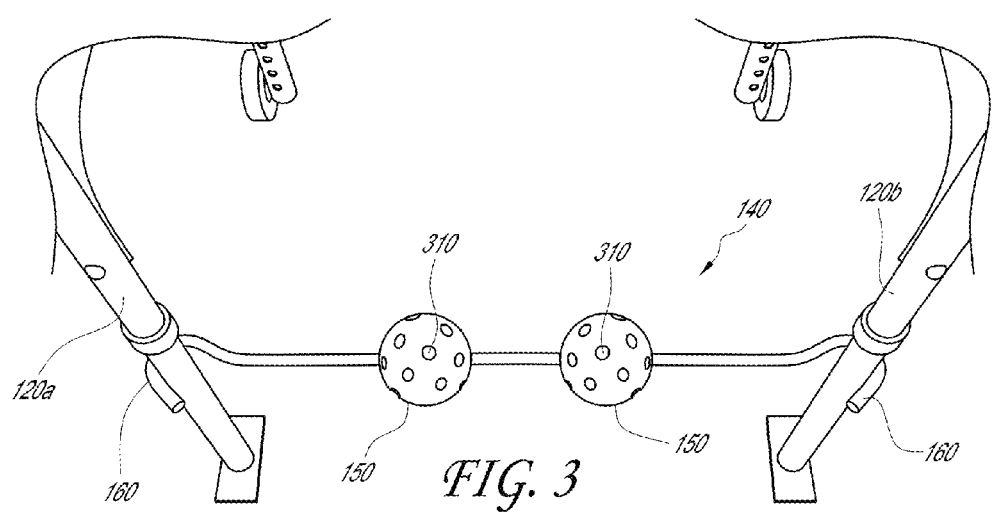
FIG. 3 is a schematic top perspective view of an embodiment of the invention with a front cross bar attached to the right and left legs of a walker and two balls attached to the front cross bar.

Referring to FIG. 3, in one embodiment, the front cross bar 140 may be moved vertically along the legs 120 of a walker and set at different heights, thus accommodating users of different heights. The front cross bar 140 and balls 150 may be selectively placed at different heights also to encourage the user to make the proper walking motion (e.g., use a natural walking slide). For example, the front cross bar 140 and balls 150 may be placed at a proper height to discourage small "shuffling" steps exhibited by users with Parkinson's Disease.

Figure 4:
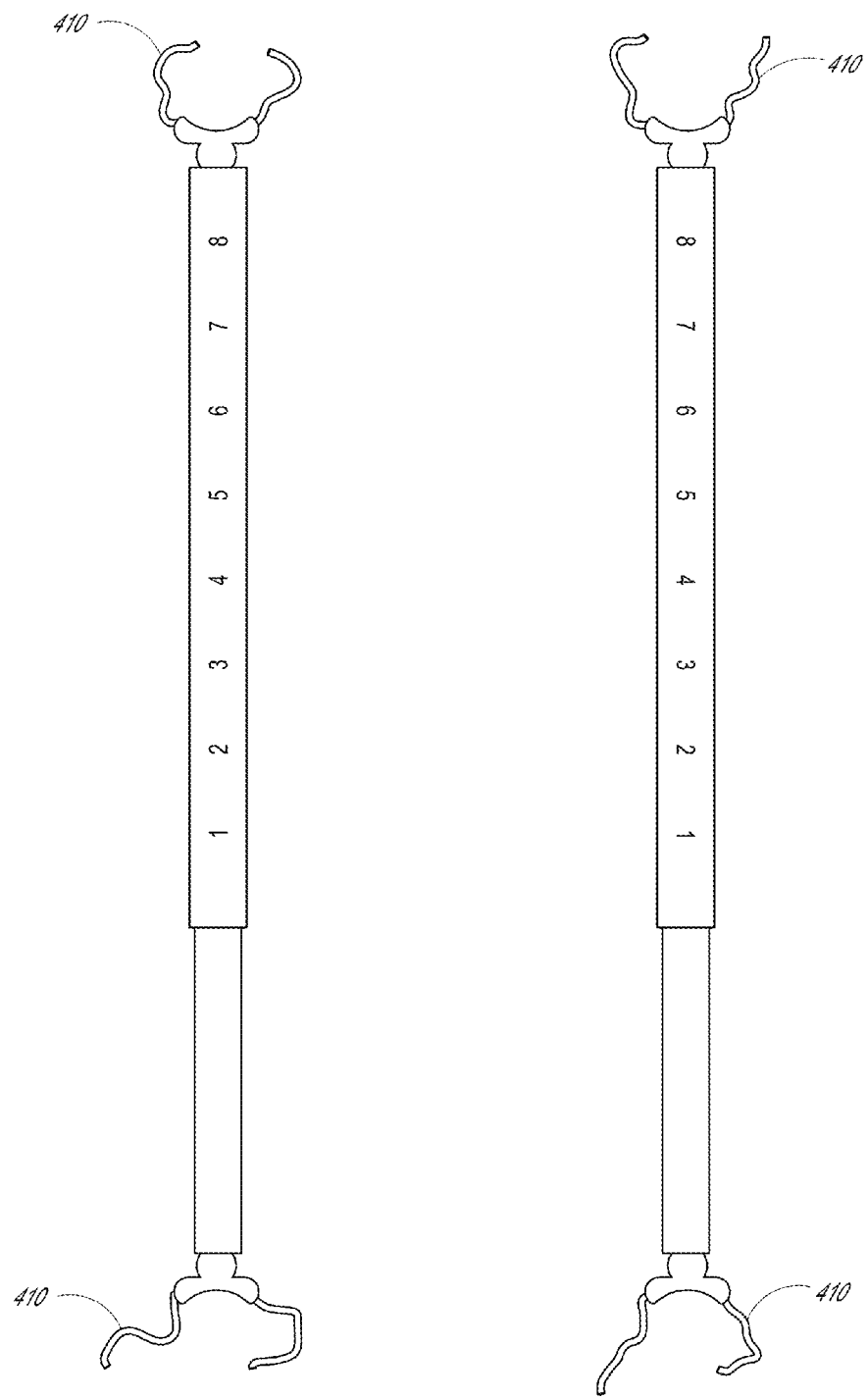
FIG. 4 is a schematic top view of an embodiment of side cross bars which are adjustable in length and have Velcro strips at both ends for attachment to a walker.
Figure 5:
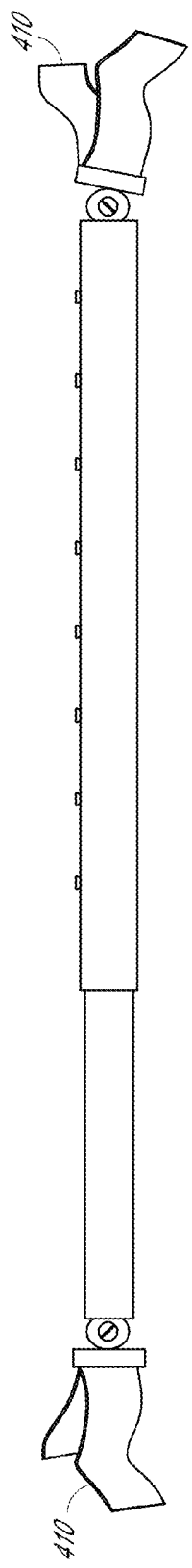
FIG. 5 is a schematic side view of the side cross bar.
Figure 6:
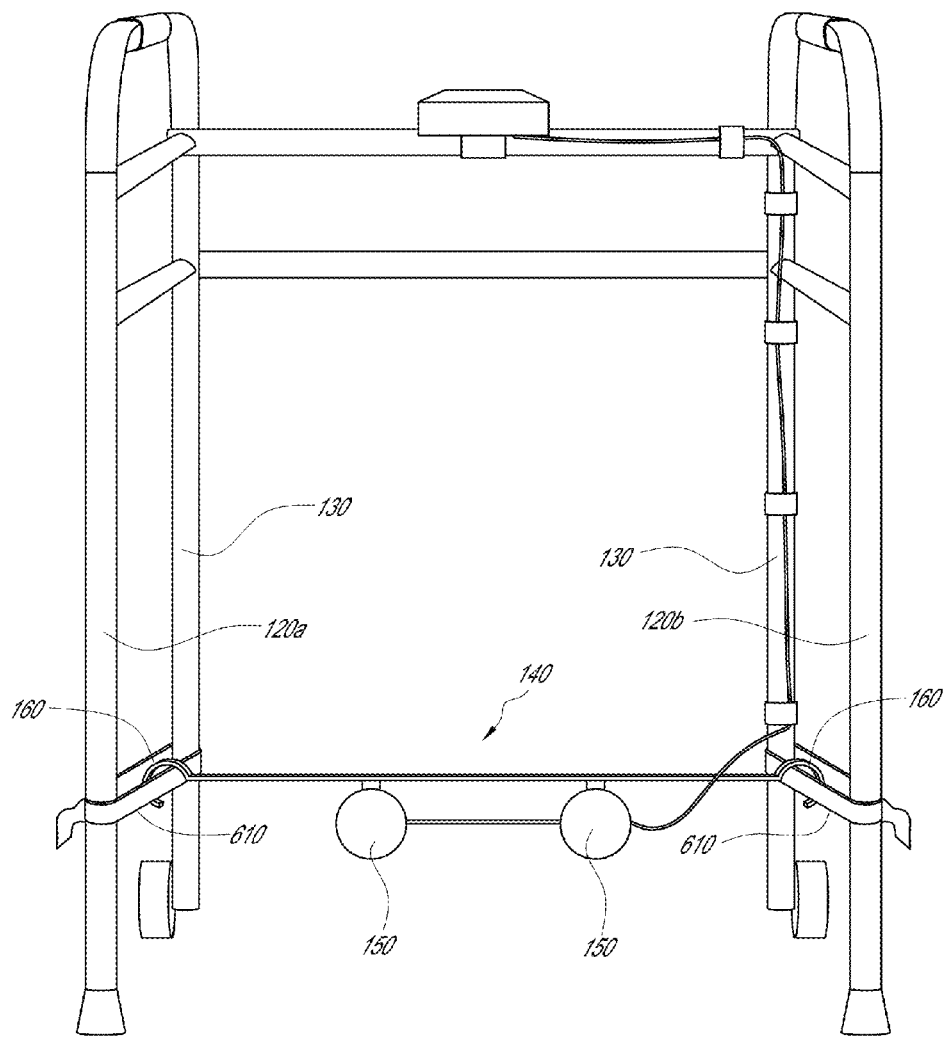
FIG. 6 is a schematic back perspective of an embodiment of the invention with two side cross bars that are adjustable nylon straps.

Exemplary embodiments of the side cross bars are illustrated in FIGS. 4-6. In one embodiment, the side cross bars are adjustable in length to fit on walkers of different sizes and shapes. For example, in one embodiment, the side cross bars are telescopic FIGS. 4-5. In one embodiment, Velcro straps 410 are included on the ends of the side cross bars for attachment to the legs of a walker. The side cross bars may attach to the legs of a walker using clamps, clips, hooks, rings, clasps, fasteners, or any other suitable attachment mechanism. Referring to FIG. 6, the side cross bars may be adjustable nylon straps 610. In one embodiment, the side cross bars may be moved vertically along the legs of a walker and set at different heights. Thus, the front cross bar 140 and the balls 150 may be positioned at different heights by attaching them to side cross bars that are movable vertically along the legs of the walker.

Figure 7:
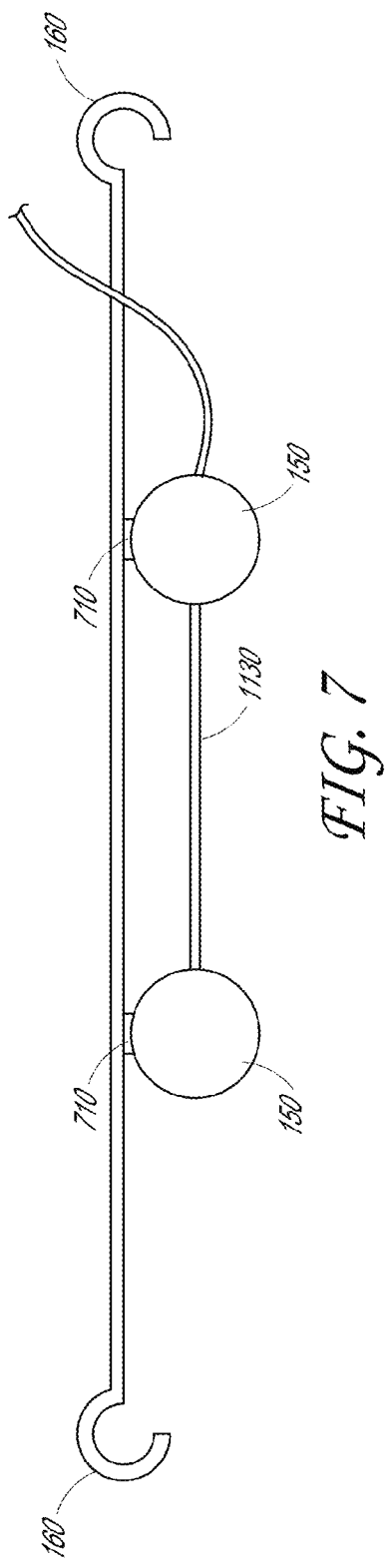
FIG. 7 is a schematic front view of two balls attached to a front cross bar by clips.
Figure 8:
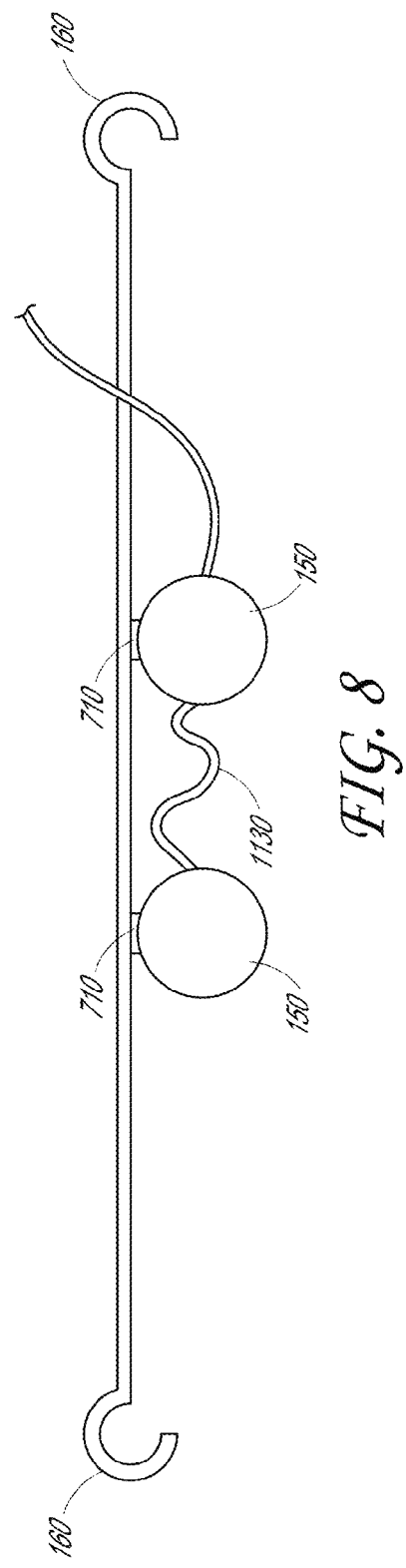
FIG. 8 is a schematic front view of two balls moved closer to each other on the front cross bar.

Referring to FIGS. 7-8, in one embodiment, the balls 150 include a clip 710 for attachment to the front cross bar 140. The balls 150 may also attach to the front cross 140 bar using any suitable mechanism, such as straps, rings, fasteners, or clasps. In one embodiment, the balls 150 are movable along the front cross bar 140 as illustrated in FIGS. 7-8. In another embodiment, the front cross bar 140 may be strung through holes 310 in the balls 150, as shown in FIG. 3. The balls in this embodiment FIG. 3 may also be movable along the front cross bar. Thus, the distance between the balls 150 may be adjusted, accommodating users of different hip widths.

Returning to FIGS. 1-2, in an exemplary embodiment of the invention, the balls light up 150a, 150b as a visual cue to help initiate movement (e.g., as part of a therapeutic exercise). In one embodiment, the user receives visual and/or auditory feedback when the user correctly executes a movement. For example, referring to FIG. 1, when the user's ankle comes within a predetermined distance to a ball 150a, a sensor inside the ball 150a is triggered, the ball 150a glows brighter and a speaker sounds a chime, then the light inside the ball turns off. In one embodiment, after the light turns off, the opposite ball 150b lights up, as illustrated in FIG. 2. The illuminated ball 150b prompts the user to move his other foot toward that ball 150b.

Figure 10:
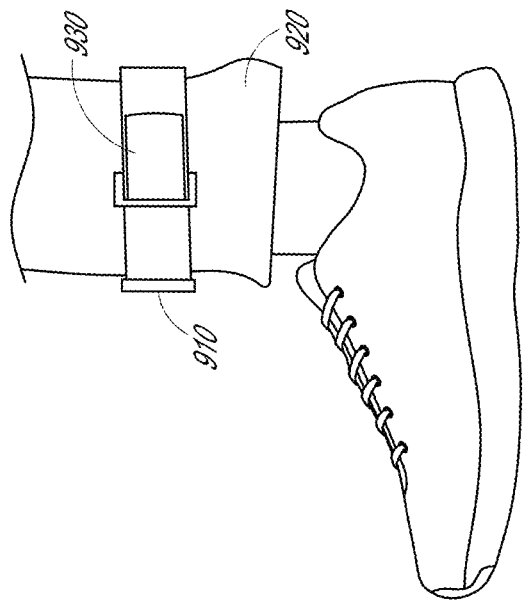
FIG. 10 is a schematic side view of the ankle strap attached to a user's ankle.
Figure 9:
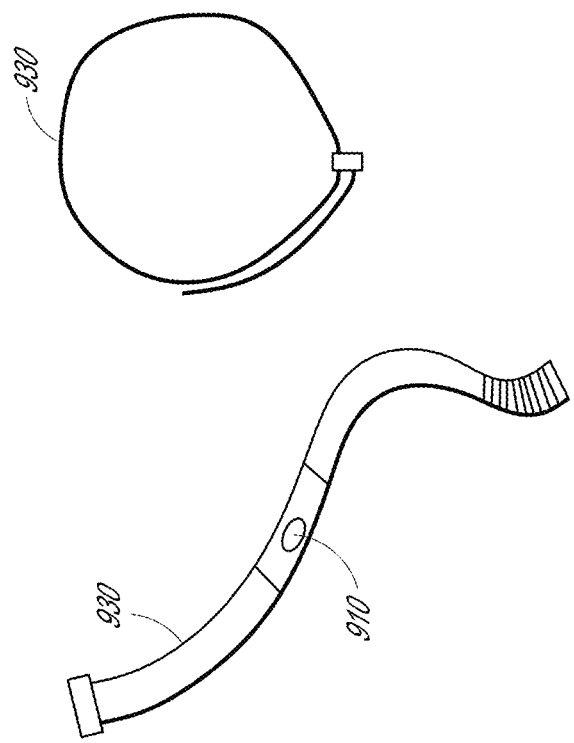
FIG. 9 is a schematic front and top view of an ankle strap with an integrated magnet.

In one embodiment, the system includes a speaker and the balls 150 include electronic circuitry, a light, and a sensor. The speaker is electronically coupled to the balls 150 so that the speaker is able to emit sound when a sensor inside a ball is triggered, for example by a user's ankle coming hear it. The light may be a light emitting diode, incandescent light, fluorescent light, halogen light, neon light, or any other suitable light. In one embodiment, the sensor is a vibration sensor, which is triggered when the sensor detects vibration. For example, vibration can be caused by the user's ankle coming into physical contact with the ball. In another embodiment, the sensor is a magnetic sensor, which is triggered when a magnet nears the sensor. Referring to FIGS. 9-10, in one embodiment, the system includes a magnet 910 attached to the user's ankle 920. In this embodiment, the magnet 910 may be integrated on an ankle strap 930 worn by the user. In another embodiment, a magnet is removably attached to the user's sneaker at the location of his ankle. When the user's ankle 920 nears the magnetic sensor, the sensor is triggered. The balls also include electronic circuitry necessary to achieve the functions just described and above with respect to FIGS. 1-2. Such electronic circuitry is well known in the art.

Figure 11:
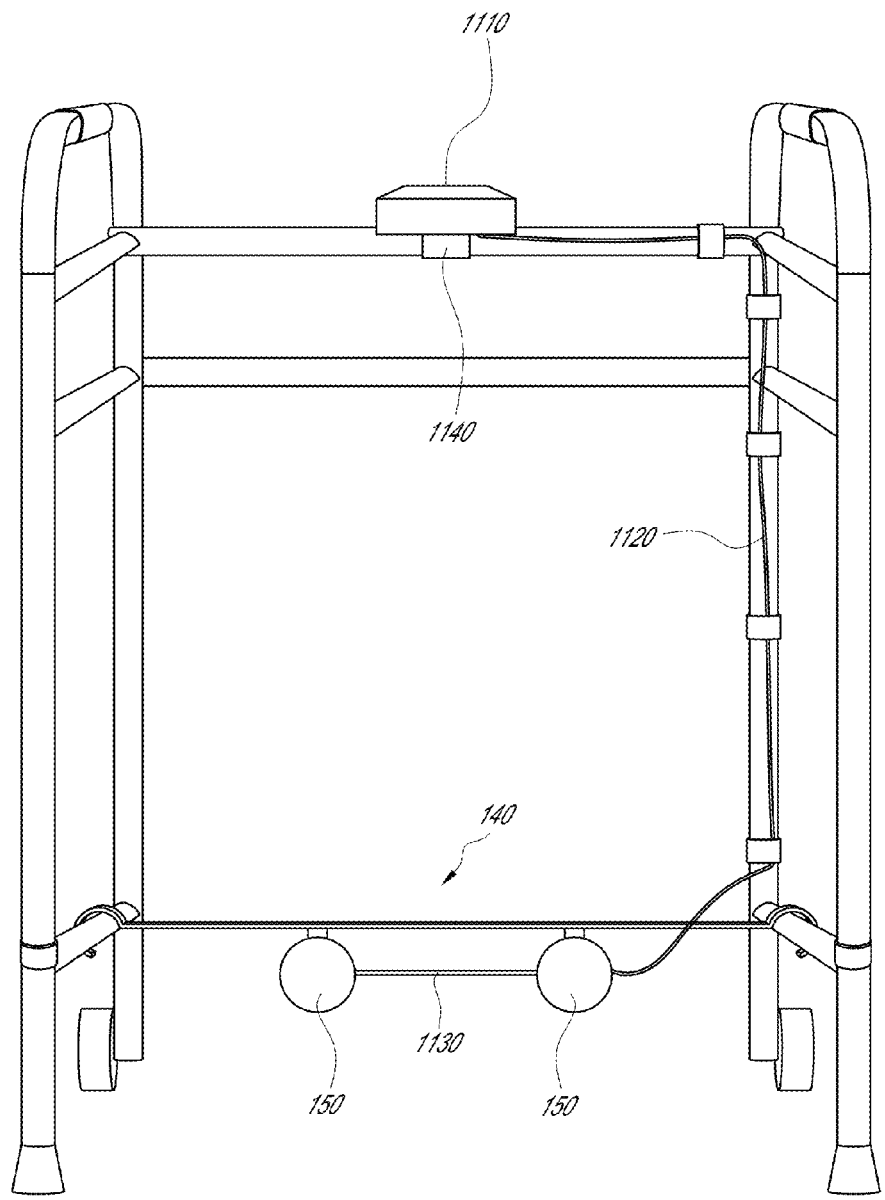
FIG. 11 is a schematic back perspective view of an embodiment of the invention with a controller.

Referring to FIG. 11, one embodiment of the invention includes a controller 111 electronically coupled to the balls 150. For example, they may be electronically coupled through a wire 112, cable, or wirelessly through Bluetooth, WiFi, or Rf. In one embodiment, the two balls 150 are connected via a flexible electronic communication wire 1130. Thus, as FIGS. 7-8 illustrate, the flexible electronic communication wire 1130 allows for adjustment of the distance between the balls 150 on the front cross bar 140. The distance between the balls 150 can be adjustable between a range of desired widths, which can be determined by the hip width of a user according to one embodiment of the invention. For example, the maximum spacing between the balls 150 can be ten inches according to one embodiment of the invention, and the spacing can be decreased to seven inches or shorter. In one embodiment, a speaker is integrated with the controller 111. In another embodiment, a speaker is physically separate from the controller and in electronic communication with the controller 111 and the pair of balls 150. In one embodiment, the speaker is removably attached to any part of the walker. In one embodiment, the controller 111 includes a headphone jack.

Figure 12:
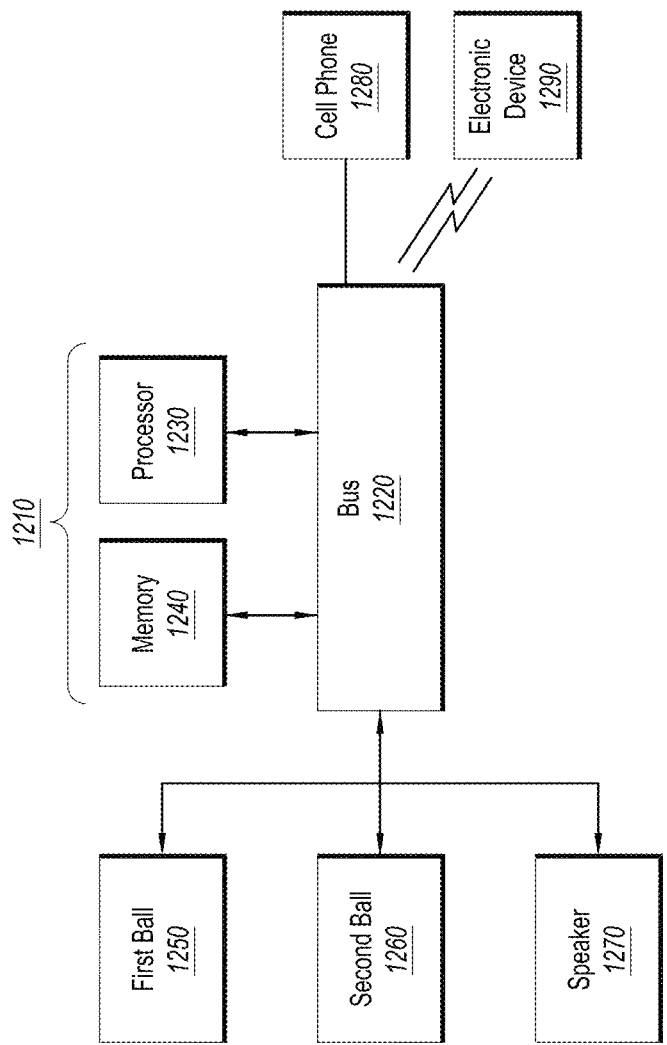
FIG. 12 is a schematic block diagram illustrating an embodiment of a processing system inside the controller.

FIG. 12 is a block diagram illustrating one embodiment of the invention with a processing system 1210 (e.g., computer processor) inside the controller 1110. In this embodiment, the system 1210 includes a bus 1220 or other communication mechanism for communicating information. The system 1210 also includes a processor 1230 and memory 1240 coupled to the bus 1220. The processor 1230 processes information and executes instructions. The memory 1240 stores information and instructions to be executed by the processor 1230. In one embodiment, the processing system 1210 sends commands to a first ball 1250, a second ball 1260, and/or speaker 1270. For example, the system 1210 may instruct the first ball 1250 to light up, as a visual cue prompting the user to move his foot toward that ball 1250. The system 1210 also receives and analyzes information from the balls 1250, 1260 and speaker 1270. For example, the system 1210 may determine whether a sensor inside the first ball 1250 has triggered, indicating that a user correctly executed a movement. If the system 1210 determines that the sensor has been triggered, the system 1210 may output instructions to first ball 1250, second ball 1260, and the speaker 1270 so that they emit feedback. In one embodiment, the feedback comprises the first ball 1250 glowing brighter, the speaker 1270 sounding a chime, then the light inside the first ball 1250 turning off. Subsequently, the second ball 1260 lights up.

In one embodiment, the processing system 1210 tracks and analyzes the user's movement history. For example, the processing system 1210 may track the times at which the first and second sensors are triggered, and determine the pace of the user's gait. In one embodiment, this data is communicated to an electronic device, such as a smart phone 1280, through an output port on the controller. In one embodiment, this data is communicated wirelessly to a computer or other electronic device 1290, which in one embodiment can store said data in a memory. The data may be sent via Rf, Bluetooth, WiFi, or any other suitable mechanism for transferring data wirelessly. In one embodiment, this data is displayed on a screen on the controller 111. In one embodiment, this data is spoken out loud through the speaker 336. Such data can be used to evaluate a user's gait history to measure progress in improving gait, as well as allow a therapist to make adjustments to therapeutic exercises for the user.

Figure 13:
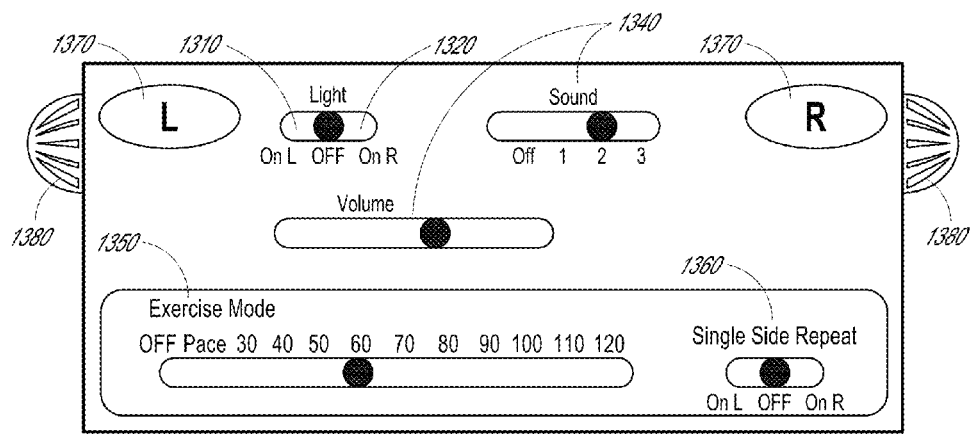
FIG. 13 is a schematic top view of an embodiment of a design of a controller.
Figure 14:
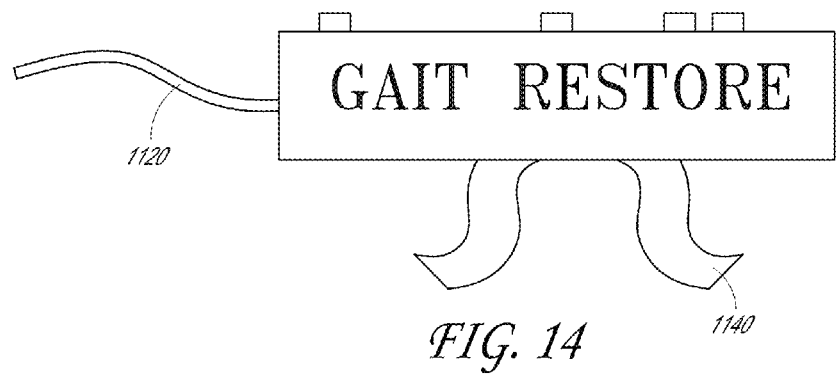
FIG. 14 is a schematic side view of the controller.
Figure 15:
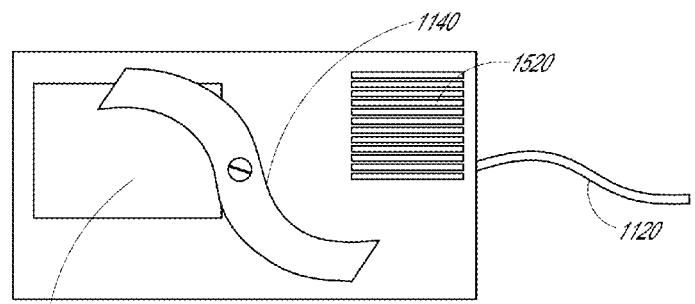
FIG. 15 is a schematic bottom view of the controller.

An exemplary embodiment of a design of the controller 1110 is illustrated in FIGS. 13-15. The controller 1110 may be powered by a battery 1510, rechargeable battery, photovoltaic power, or any other suitable power source, which can power all electronics in the controller 1110. In one embodiment, the controller 1110 includes Velcro straps 1140 for attachment to the walker. Thus, the controller 1110 can be attached to walkers of different sizes and shapes. The controller 1110 may also be attached to the walker using straps, hooks, clips, clamps, or any other suitable mechanism. In one embodiment, as shown in FIG. 11, the controller 1110 is attached to the walker at a location that is easily accessible to the user.

The controller 1110 includes a user interface for controlling visual and auditory settings. The settings may be controlled through knobs, dials, buttons, switches, touch screens, combinations thereof, or any other suitable mechanism. The user may utilize the visual and auditory settings in any combination.

FIGS. 1-2 illustrate the operation of the system when the light settings on the controller 1110 are set at "On L," 1310 or "On R" 1320. If the light settings are set "On L," 1310, the left ball 150*a* will light up first. If a sensor inside the left ball 150*a* is triggered, for example by a user's ankle 920 coming near it, the ball 150*a* will glow brighter, then turn off. Subsequently, the right ball 150*b* lights up. If a sensor inside the right ball 150*b* is triggered, the right ball 150*b* glows brighter, then turns off. After, the left ball 150*a* turns on. Thereafter, the sequence continues. If the settings are set at "On R," 1320 the system performs in the same way, except that the right ball 150*b* lights up first. In one embodiment, only one ball illuminates at a time, thus allowing for individual visual cueing for each leg so that there is a specific prompt for each step.

The visual cues may comprise a variety of light characteristics such as color and intensity. The visual cues may also comprise a variety of patterns. In one embodiment, the visual cue is a green glow that flutters and shimmers. The visual feedback may also comprise a variety of light characteristics and patterns. For example, if a user correctly executes a movement, the light in the ball may turn off, change color, change intensity, or exhibit a pattern comprising any combination of the light turning on and off, changing colors, and/or changing intensities. In one embodiment, the user may control the visual cues and feedback through the controller 1110. In one embodiment, the user may choose to keep both balls 150 lit. In this embodiment, both balls 150 will stay lit even if a sensor inside either ball is triggered.

Returning to FIGS. 13-15, if the sound 1340 is turned on, the system will return auditory feedback, such as a pleasing and rewarding chime, when a sensor is triggered inside a ball. The auditory feedback can be a tone, a series of tones, a chime, a melody, a synthesized voice, or any other suitable sound. The user may control the type of auditory feedback 1340 through the controller 1110. The user may utilize the sound and light features in any combination. In one embodiment, both balls stay lit and only the sound triggers when the user's foot nears the ball. In this embodiment, the system does not return visual feedback.

Referring to the "Exercise Mode," 1350 the user may set the pace of the cues. In Exercise Mode 1350, a sound cue may also prompt the user to initiate a movement. The sound cue coincides in time with any visual cue. In one embodiment, the user may set a metronome pace for the visual and auditory cueing of the balls. In one embodiment, the user may increase or decrease the frequency of the visual cues and sound cues. The user may also choose to practice Exercise Mode 1350 for only one leg by utilizing the "Single Side Repeat" 1360 feature on the controller 1110. In Single Side Repeat 1360, the cues repeat in one ball while the other ball remains off. Single Side Repeat 1360 allows for repetitive mobilization of a single leg. In Exercise Mode, the system does not output visual or auditory feedback. During Exercise Mode, the user attempts to match the visual and auditory cues with his strides. The Exercise Mode can be used to train the user's cadence and stepping speed. In one embodiment, the controller processing system 1210 may determine the successful triggering percentage during an Exercise Mode session. The processing system 1210 may then communicate this data to an electronic device such as a cell phone, computer, a screen on the controller, or a speaker.

In one embodiment, the controller 1110 includes independent triggers 1370. When the independent triggers 1370 are activated, the corresponding ball lights up. Thus, the user can control which ball illuminates to provide a visual cue and aid the initiation of movement. For example, if the user experiences freezing or hesitation, the user can activate the appropriate trigger to illuminate the ball to provide a visual cue. In one embodiment, the controller includes indicator lights 1380, which light on and off as the corresponding balls light on and off.

Figure 16:
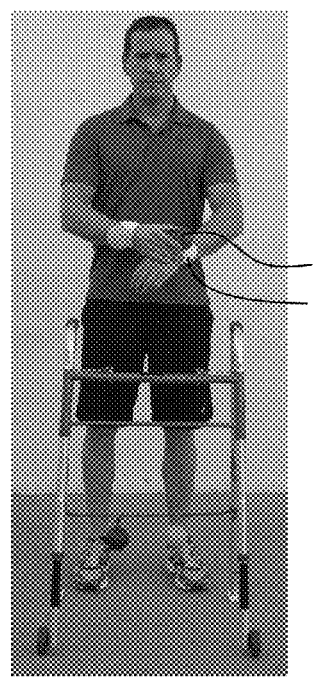
FIG. 16 is a front view of a wrist ball attached to a user's wrist.
Figure 17:
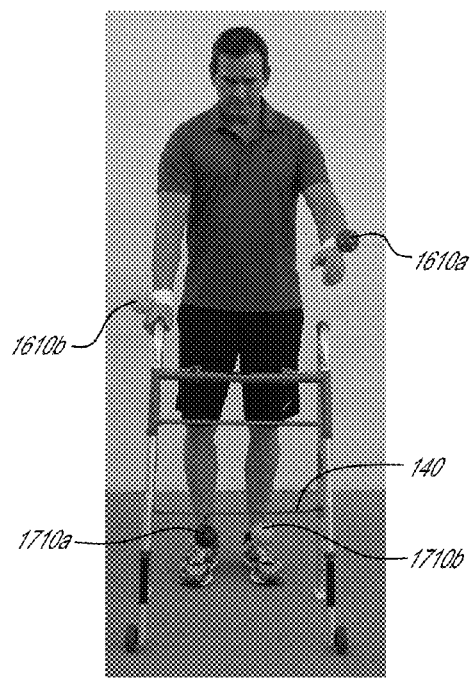
FIG. 17 is an embodiment of the invention with two differently colored wrist balls and two differently colored balls attached to a walker.
Figure 18:
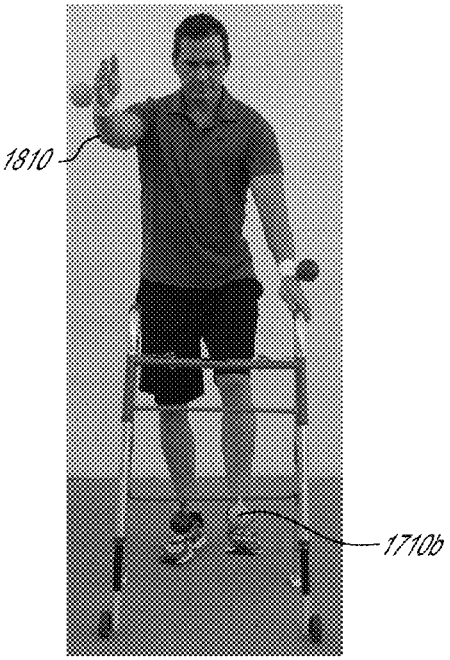
FIG. 18 is a schematic front view of an embodiment of the invention with a user practicing a reciprocal movement exercise.
Figure 19:
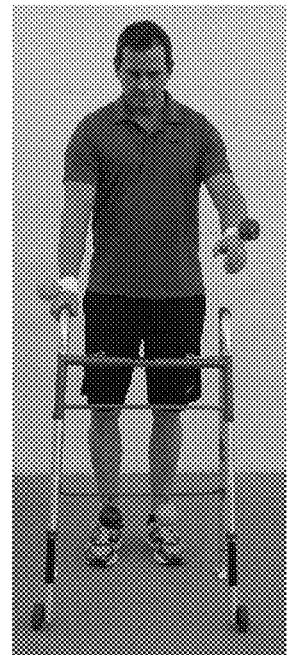
FIG. 19 is a schematic front view of an embodiment of the invention with a user practicing a reciprocal movement exercise.
Figure 20:
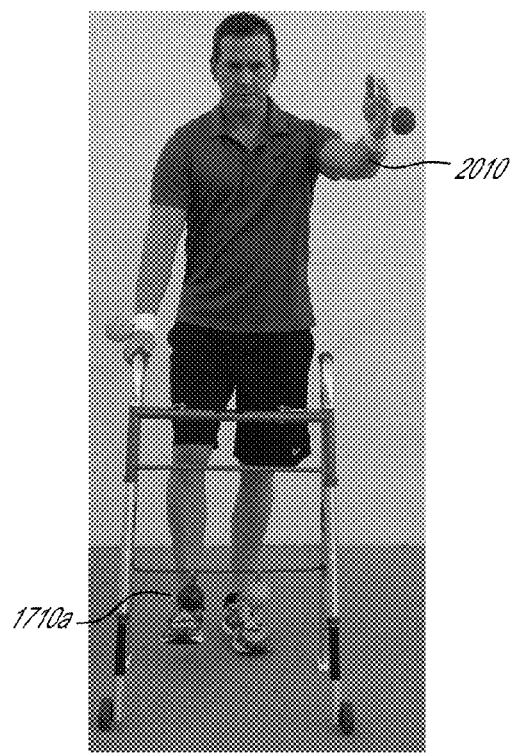
FIG. 20 is a schematic front view of an embodiment of the invention with a user practicing a reciprocal movement exercise.
Figure 21:
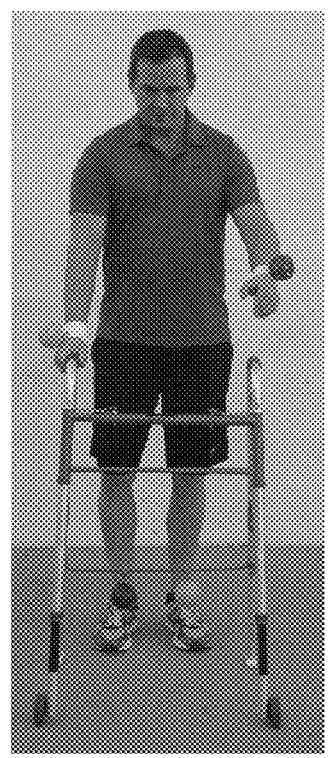
FIG. 21 is a schematic front view of an embodiment of the invention with a user practicing a reciprocal movement exercise.
Figure 26:
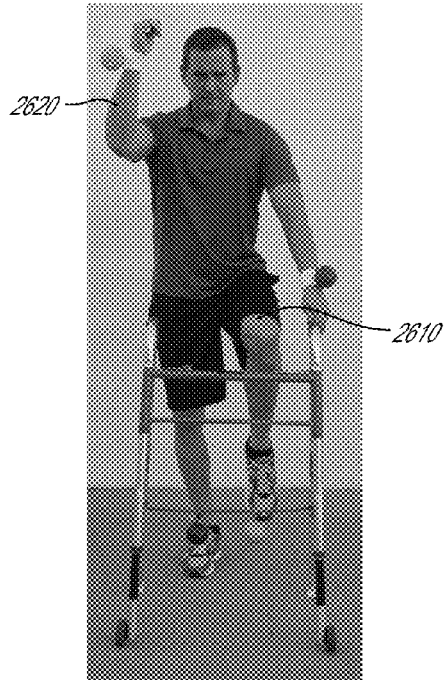
FIG. 26 is a schematic front view of an embodiment of the invention with a user practicing a reciprocal movement exercise with marching steps.
Figure 27:
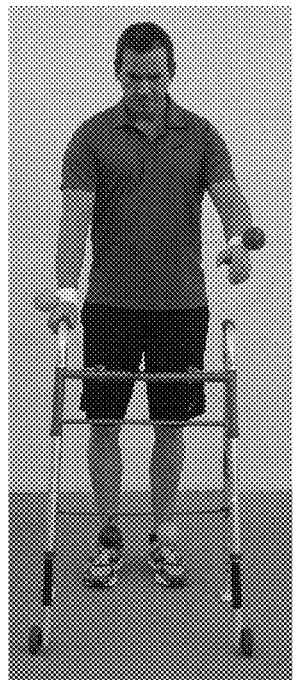
FIG. 27 is a schematic front view of an embodiment of the invention with a user practicing a reciprocal movement exercise with marching steps.
Figure 28:
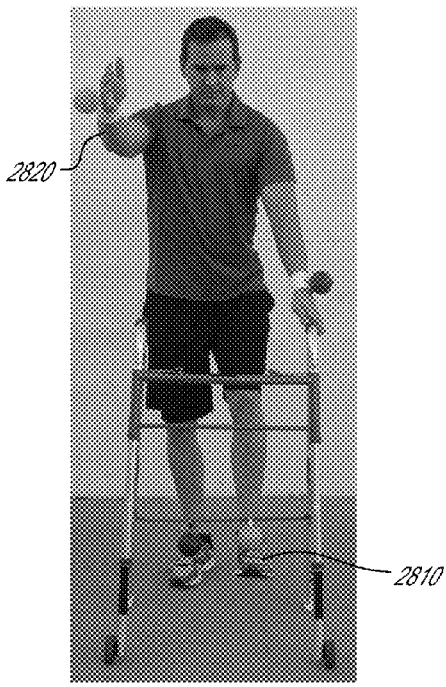
FIG. 28 is a schematic front view of an embodiment of the invention with a user practicing a reciprocal movement exercise with marching steps.
Figure 29:
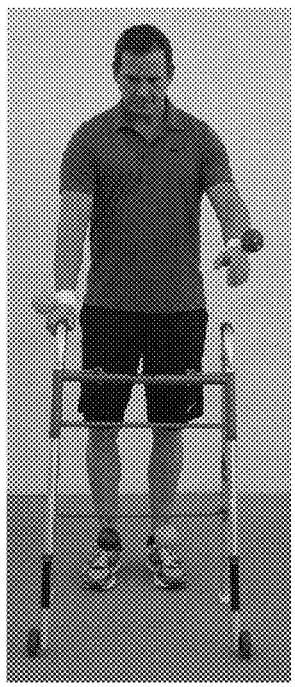
FIG. 29 is a schematic front view of an embodiment of the invention with a user practicing a reciprocal movement exercise with marching steps.
Figure 30:
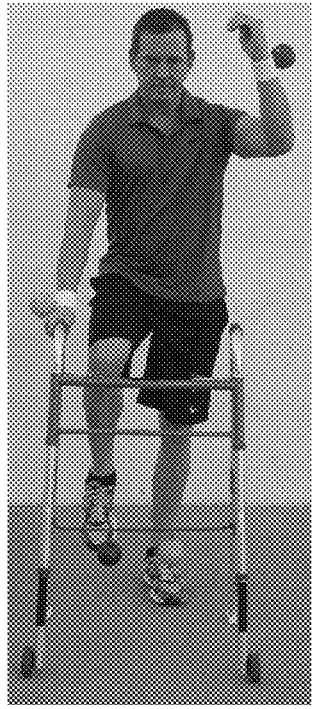
FIG. 30 is a schematic front view of an embodiment of the invention with a user practicing a reciprocal movement exercise with marching steps.
Figure 31:
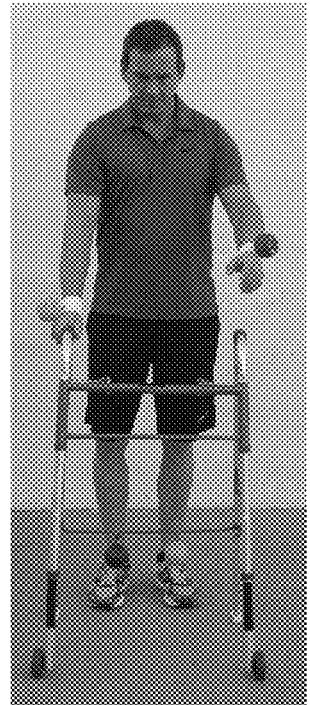
FIG. 31 is a schematic front view of an embodiment of the invention with a user practicing a reciprocal movement exercise with marching steps.
Figure 32:
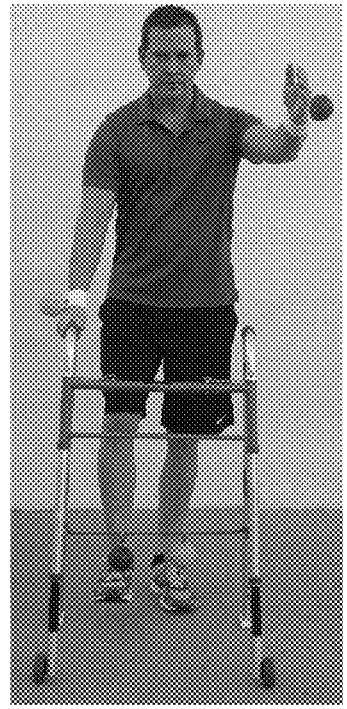
FIG. 32 is a schematic front view of an embodiment of the invention with a user practicing a reciprocal movement exercise with marching steps.
Figure 33:
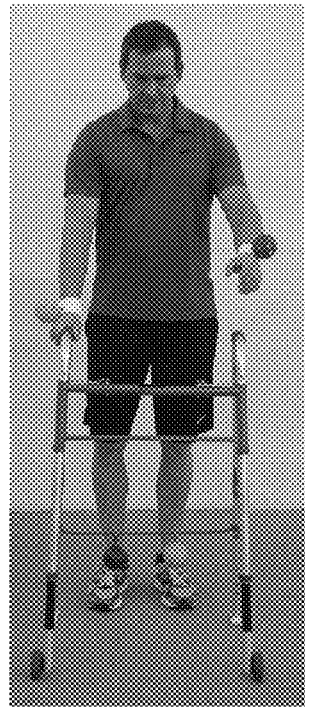
FIG. 33 is a schematic front view of an embodiment of the invention with a user practicing a reciprocal movement exercise with marching steps.

Referring to FIGS. 16-17, one embodiment of the invention includes a pair of different colored wrist balls 1610 removably attached to the user's wrists. For example, a wrist ball may be attached to an elastic band 1620 that the user wears around his wrist. The wrist ball may also be attached to the user's wrist using straps, strings, bracelets, or any other suitable mechanism.

Referring to FIG. 17, the colors of the balls 1710 attached to the front cross bar 140 of the walker match the colors of the wrist balls 1610. For example, in one embodiment, one wrist ball is red 1610*a* and the other wrist ball is blue 1610*b*. In this embodiment, one of the balls attached to the walker is red 1710*a* and the other ball is blue 1710*b*.

The user wears on one wrist the colored ball that corresponds with the user's opposite foot. For example, if the left ball 1710*b* attached to the walker is blue, the right wrist is where the user wears the blue wrist ball 1610*b*. The colored balls serve as visual cues, indicating to the user which arm should be moved with which foot. The user should practice movements corresponding with the same colored balls. For example, the user may practice movements corresponding with the blue colored balls. In this example, the user moves his left foot while at the same time moving his right arm. The user moves his left foot because the blue ball on the walker is toward the left. Thus, the user moves his left foot toward the blue ball. In addition, the blue wrist ball is on the user's right wrist. Thus, the user moves his right arm. In this manner, the system can be used train reciprocal movement. In one embodiment, the invention includes a booklet or DVD with instructions on training exercises.

An exemplary method of exercising is illustrated in FIGS. 18-21. The user moves his left foot toward the left ball 1710*b* on the walker, while extending his right arm outward 1810. Then the user returns to standing position FIG. 19. Next, the user moves his right foot toward the right ball 1710*a* on the walker, and extends his left arm outward 2010. Next, the user returns to standing position FIG. 21. The user then continues practicing these movements.

Referring to FIGS. 22-25, the user makes a lateral step with his left leg 2210, while extending his right arm laterally 2220. Then, the user returns to standing position FIG. 23. Next, the user makes a lateral step with his right leg 2410, while extending his left arm laterally 2420. Next, the user returns to standing position FIG. 25. The user then continues practicing these movements.

The user may combine any number of different exercises. For example, the user may combine a "marching pattern" with the exercise illustrated in FIGS. 18-21. Referring to FIGS. 26-33, the user bends his left foot upward 2610 while bending his right arm upward 2620. The user then returns to standing position FIG. 27. Next, the user moves his left foot toward the left ball on the walker 2810, while extending his right arm outward 2820. The user then returns to standing position FIG. 29. Next, the user repeats the same exercise but using the opposite limbs of his body, as illustrated in FIGS. 30-33. The user then continues practicing these movements illustrated in FIGS. 26-33.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above.

What is claimed is:

1. A system for improving movement in a user with impaired gait, the system comprising:
    a flexible front cross bar configured for removable attachment to a walker;
    a first indicator configured to attach to the front cross bar, the first indicator including electronic circuitry, a first light, and a first sensor, wherein the first indicator is configured to provide a first visual cue; and
    a second indicator configured to attach to the front cross bar, the second indicator including electronic circuitry, a second light, and a second sensor, wherein the second indicator is configured to provide a second visual cue,
    wherein the first visual cue and the second visual cue instruct the user to move his or her legs in a particular order so as to improve a walking gait of the user.

2. The system of claim 1, wherein the first sensor is a magnetic sensor and the second sensor is a magnetic sensor, wherein the system further comprises one or more magnets configured to removably attach to the user's ankles.

3. The system of claim 1, wherein the first visual cue comprises the first light turning on, and the second visual cue comprises the second light turning on.

4. The system of claim 1, wherein the first indicator is configured to provide a first visual feedback when the first sensor is triggered, and the second indicator is configured to provide a second visual feedback when the second sensor is triggered.

5. The system of claim 4, wherein the first visual feedback comprises the first light glowing brighter, followed by the first light turning off, and the second visual feedback comprises the second light glowing brighter, followed by the second light turning off.

6. The system of claim 1, wherein the system further comprises a speaker electronically coupled to the first and second indicators, wherein the speaker is configured to provide auditory feedback when the first or second sensor is triggered.

7. The system of claim 1, further comprising:
    a controller in electronic communication with the first indicator and the second indicator,
    wherein the controller is configured to control operation of the first visual cue and the second visual cue.

8. The system of claim 7, further comprising:
    a speaker in electronic communication with the controller, wherein the speaker is configured to provide auditory feedback when the first or second sensor is triggered,
    wherein the controller is configured to control operation of the auditory feedback.

9. The system of claim 7, wherein the first indicator is configured to provide a first visual feedback when the first sensor is triggered, and the second indicator is configured to provide a second visual feedback when the second sensor is triggered, wherein the controller is configured to control operation of the first visual feedback and the second visual feedback.

10. The system of claim 7, wherein the controller includes one or more independent triggers.

11. The system of claim 7, wherein the controller is configured to track times at which the first sensor is triggered and times at which the second sensor is triggered.

12. The system of claim 7, wherein the controller is configured to control the frequency of the first visual cue and the frequency of the second visual cue.

13. The system of claim 1, wherein the vertical position of the front cross bar is adjustable.

14. The system of claim 1, wherein the anterior-posterior position of the front cross bar is adjustable.

15. The system of claim 1, wherein the first and second indicators are configured to move along the front cross bar such that the spacing between the first and second indicators is adjustable.

16. A system for improving movement in a user with impaired gait, the system comprising:
    a flexible front cross bar configured for removable attachment to a walker,
    a first indicator configured to attach to the front cross bar, wherein the first indicator is configured to provide a first visual cue; and
    a second indicator configured to attach to the front cross bar, wherein the second indicator is configured to provide a second visual cue,
    wherein the first visual cue and the second visual cue instruct the user to move his or her legs in a particular order so as to improve a walking gait of the user.

17. The system of claim 16, wherein the first visual cue comprises a first predetermined color and the second visual cue comprises a second predetermined color.

18. The system of claim 16, wherein the first visual cue is provided by a first light associated with the first indicator, and the second visual cue is provided by a second light associated with the second indicator.

19. The system of claim 18, further comprising:
    a controller in electronic communication with the first indicator and the second indicator,
    wherein the controller is configured to control operation of the first visual cue and the second visual cue.

20. The system of claim 16, further comprising:
    a first wrist indicator configured to removably attach to the user's first wrist, wherein the first wrist indicator is configured to provide a third visual cue; and
    a second wrist indicator configured to removably attach to the user's second wrist, wherein the second wrist indicator is configured to provide a fourth visual cue,
    wherein the third visual cue and the fourth visual cue instruct the user to move arms in a particular order so as to improve reciprocal movement of the user during a walking gait.

\* \* \* \* \*